United States Patent [19]

Close

[11] 4,150,891
[45] Apr. 24, 1979

[54] EXPOSURE CONTROL APPARATUS INCLUDING RATE RESPONSIVE LAG COMPENSATION

[75] Inventor: Thomas H. Close, Rochester, N.Y.

[73] Assignee: Eastman Kodak Company, Rochester, N.Y.

[21] Appl. No.: 874,443

[22] Filed: Feb. 2, 1978

[51] Int. Cl.² .................... G03B 7/08; G03B 15/03
[52] U.S. Cl. .................. 354/32; 354/51;60 F;128;139
[58] Field of Search ................ 354/32, 33, 34, 35, 354/50, 51, 60 R, 60 F, 128, 139, 145, 149; 315/241 P

[56] References Cited

U.S. PATENT DOCUMENTS

| | | | |
|---|---|---|---|
| 3,200,723 | 8/1965 | Topaz | 354/34 |
| 3,519,879 | 7/1970 | Ogawa | 315/241 P X |
| 3,737,721 | 6/1973 | Ogawa | 354/33 X |
| 4,019,092 | 4/1977 | Stiller | 315/241 P X |
| 4,033,682 | 7/1977 | Nakamura et al. | 354/50 X |
| 4,034,383 | 7/1977 | Mashimo et al. | 354/50 X |
| 4,057,811 | 11/1977 | Harrison | 354/33 |
| 4,058,818 | 11/1977 | Johnson et al. | 354/33 |

Primary Examiner—Michael L. Gellner
Attorney, Agent, or Firm—D. P. Monteith

[57] ABSTRACT

An exposure control circuit of the type adapted to produce an exposure termination signal after a time interval related to a time integral of light intensity. The control circuit includes lag compensation means responsive to the light intensity at the time the exposure termination signal is produced, or responsive to a change in light intensity from the beginning of exposure measurement to the time the exposure termination signal is produced, to adjust the time interval to compensate for lag. The control circuit further includes improved lag compensation means responsive to the time rate of change of light intensity at the time that the exposure termination signal is produced for further adjusting the time interval to thereby provide improved lag compensation.

5 Claims, 6 Drawing Figures

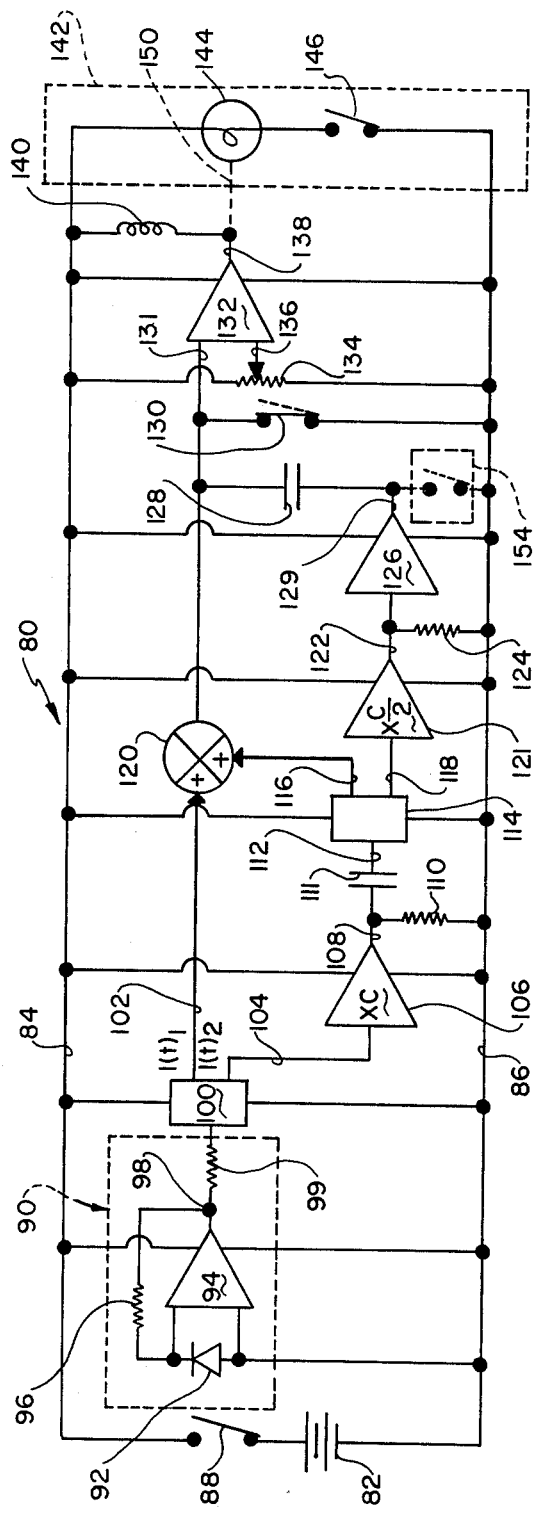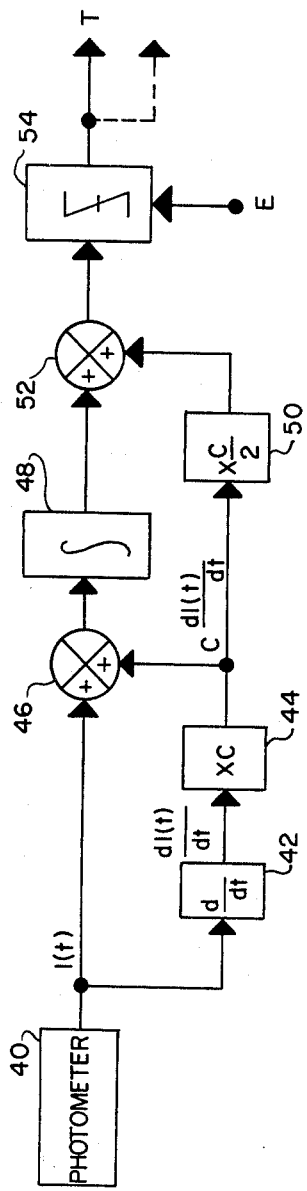
FIG. 4

EXPOSURE CONTROL APPARATUS INCLUDING RATE RESPONSIVE LAG COMPENSATION

CROSS-REFERENCE TO A RELATED APPLICATION

Reference is hereby made to U.S. patent application Ser. No. 879,525 entitled "Exposure Control Apparatus Including General Purpose Lag Compensation" by G. Corey and P. Haas, filed Feb. 21, 1978.

BACKGROUND OF THE INVENTION

1. Field of the Invention

This invention relates to exposure control apparatus for photographic cameras and more particularly to such exposure control apparatus including light responsive lag compensation.

2. Discussion Relative to the Prior Art

Many photographic cameras include automatic exposure control apparatus adapted to terminate exposure, for example, by quenching an electronic flash tube and/or by closing a shutter, in response to an exposure termination signal. The exposure termination signal is generated by a light responsive timing circuit that produces the signal as a function of a time integral of scene light intensity. All such exposure control apparatus exhibit a characteristic time delay from the time the exposure termination signal is generated to the time that actual exposure is terminated. This time delay, is commonly called the "lag time." If the lag time is associated with the quenching of electronic flash, it will be herein referred to as "quench lag," and if associated with the closing of a shutter, it will be referred to as "shutter lag."

The exposure that occurs during a lag time can be a significant portion of the total exposure, and unless the lag is effectively accounted for by the exposure control apparatus, an appreciable exposure error might result.

One way of accounting for lag —represented by U.S. Pat. No. 3,200,723 for shutter lag compensation and U.S. Pat. No. 3,519,879 for quench lag compensation— is to continuously bias an integrated photocell response by a function of the instantaneous light intensity-I(t). Such lag compensation arrangements require an external mode switch to deactivate the lag compensation when an exposure is made in ambient light, and are not adapted for exposures in the fill-flash mode.

The referenced copending patent application discloses an exposure control apparatus including general purpose lag compensation. The apparatus includes a lead time for lag compensation in ambient light and means responsive to a change in light intensity for lag compensation with flash or fill-flash illumination. Such exposure control apparatus accomplishes lag compensation with the additional advantage that external mode switching is not required to change from ambient mode to a flash mode of exposure. The function of such apparatus can be described as solving, for T, an exposure equation of the form:

$$E = \int_0^T [I(t) + C\frac{dI(t)}{dt}] dt \qquad (1)$$

where:
E is a predetermined constant representing the required exposure,
I(t) is the intensity of scene light as a function of time,
C is a predetermined constant,
O is the time at which exposure measurement is commenced, and
T is the time required to achieve E.
Or upon integrating, equation 1 becomes:

$$E = \int_0^T I(t) dt + CI(T) - CI(O) \qquad (2)$$

where:
I(O) is the intensity of scene light at the instant exposure measurement is commenced, and
I(T) is the intensity of scene light at the time that the exposure termination signal is generated.

The lag compensation arrangements discussed above generally improve flash exposure for the intermediate to distant flash range; however, there is still observed a substantial flash error for extremely close-up flash exposures. One approach that has been suggested for providing additional compensation for lag during extremely close-up flash photography is to provide a time-variable bias on the trip point of a level sensitive trigger circuit. The time-variable bias is caused to decrease relatively rapidly, thereby affecting only extremely close-up exposures that "time out" in a relatively short time. Extremely close-up, hence, short, exposures receive a correction inversely proportional to their time duration. Such a scheme for applying a time-variable bias to the trip point of a trigger circuit is shown in U.S. Pat. No. 3,737,721 where it is disclosed in the context of compensation for electronic flash quench lag. If used to compensate for shutter lag, this scheme would necessarily have to be disabled during ambient mode photography, thereby requiring the addition of external mode switches.

For the reasons outlined above, it is desirable to have an improved exposure control apparatus that compensates for the effect of lag during extremely close-up flash photography and also works in the ambient mode of exposure without the requirement for external mode switches.

SUMMARY OF THE INVENTION

Accordingly, exposure control apparatus of the type adapted to produce an exposure termination signal after a time interval related to a time integral of light intensity, having lag compensation means responsive to the light intensity at the time the exposure termination signal is produced or a change in light intensity during light measurement, is provided with further lag compensation means responsive to the time rate of change of the light intensity at the time the exposure termination signal is produced. This further corrects the exposure, whereby proper exposure is obtained for extremely close-up flash without the need for external mode switches.

According to a preferred embodiment of the invention, the exposure control apparatus includes a photometer for measuring the intensity of scene light and producing a photosignal corresponding thereto. A differentiator supplied with the photosignal produces a signal corresponding to the time derivative of the photosignal. The derivative of the photosignal is supplied to a first multiplier that multiplies the derivative of the photosignal by a first predetermined constant. A second multiplier multiplies the derivative by a second predetermined constant. A summer sums the photosignal and the product from the first multiplier, and an integrator receives the signal from the summer and produces a signal representing the time integral of the sum. A second summer sums the signal from the integrator with the product from the second multiplier and the resulting signal is applied to the switching input of a trigger circuit that is adapted to produce an output signal, representing the exposure termination signal, when the signal at the switching input represents the total exposure required.

The invention, and its advantages, will become more apparent in the detailed description of a preferred embodiment presented below.

BRIEF DESCRIPTION OF THE DRAWINGS

The invention will be described with reference to the accompanying drawings, wherein:

FIG. 4 is a signal flow chart for an exposure control apparatus including rate responsive lag compensation according to the present invention;

FIG. 5 is a schematic circuit diagram of an exposure control circuit according to the present invention that embodies the signal flow shown in FIG. 4.

DESCRIPTION OF THE PREFERRED EMBODIMENT

Figure 1:
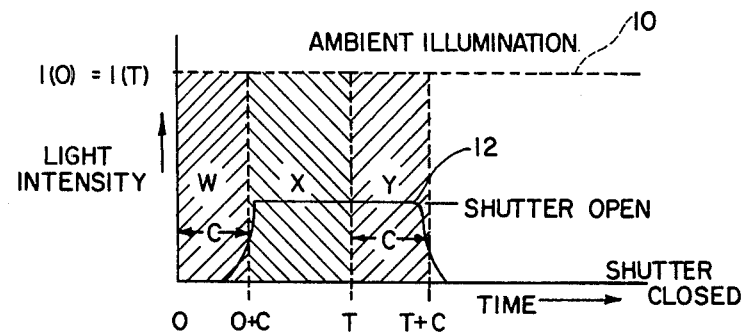
FIG. 1 is a graph showing a shutter profile superimposed upon a plot of ambient light intensity versus time.
Figure 2:
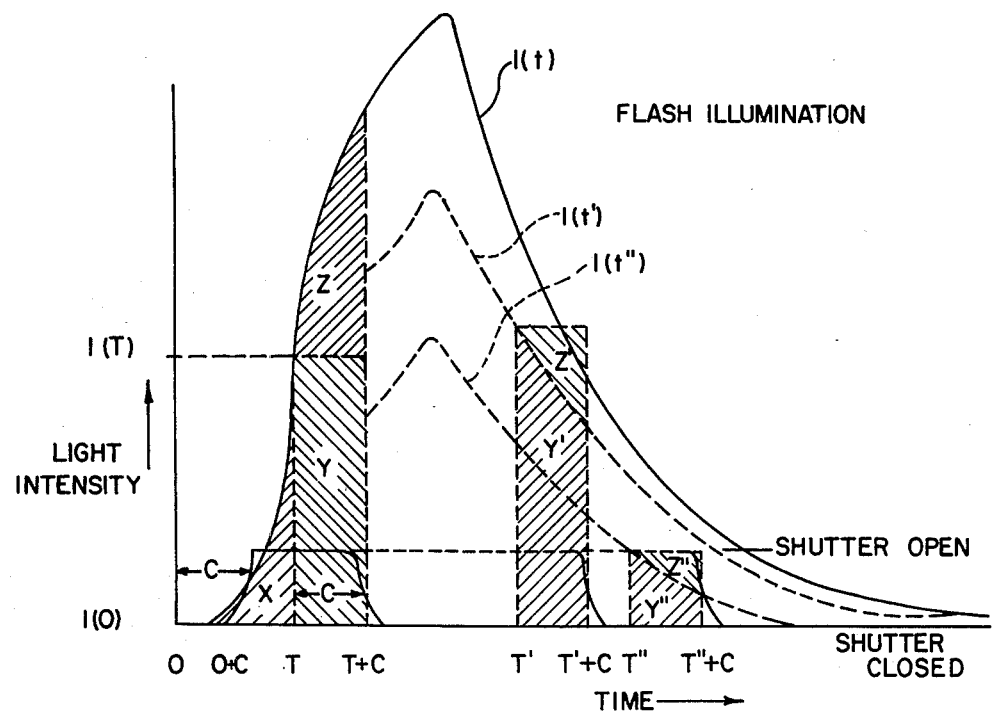
FIG. 2 is a graph showing a shutter profile superimposed upon a plot of flash light intensity versus time for several subject distances.
Figure 3:
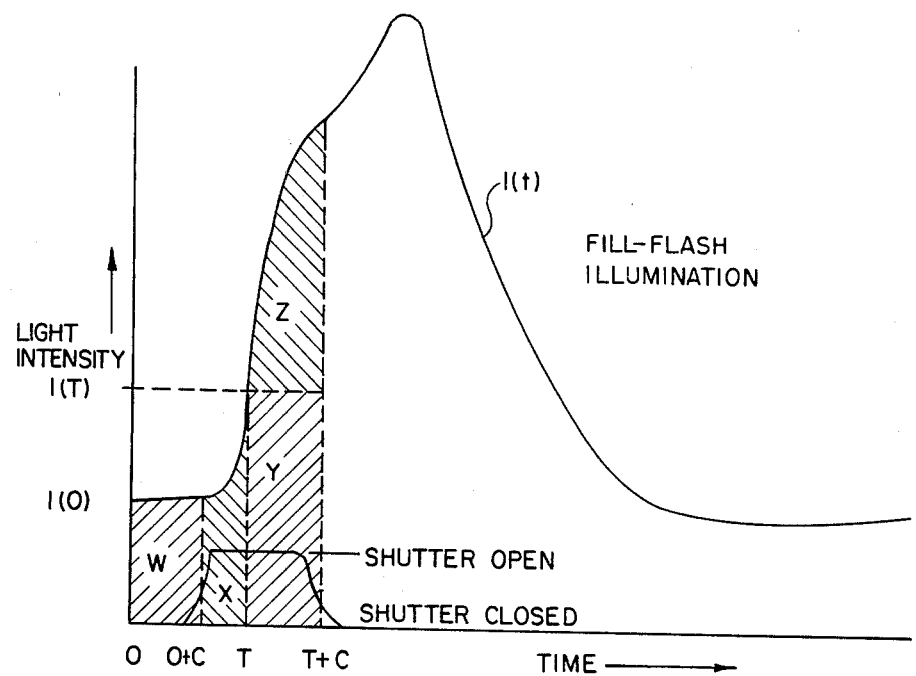
FIG. 3 is a graph showing a shutter profile superimposed on a plot of fill-flash illumination versus time.

One way that the physical significance of the terms in equation 2 above may be explained is with reference to the accompanying FIGS. 1-3. FIGS. 1, 2 and 3 show shutter profiles superimposed upon plots of light intensity versus time for ambient, flash, and fill-flash mode exposures, respectively. In the discussion that follows, it has been assumed that the opening and closing portion of the shutter profiles, but not the shutter lag time, can be safely ignored and that chemical flash profiles start their major upturn substantially coincident with the opening portion of the shutter profile. The invention will be described with respect to chemical flash illumination; its applicability to electronic flash will be discussed below. It has also been assumed that the exposure control system includes a lead time that has been set equal to the lag time of the shutter. It is further assumed that the predetermined constant C in equation 2 is substantially equal to the lag time of the shutter expressed in seconds. The reason for this latter assumption will become apparent during the discussion that follows.

Referring to FIG. 1, it can be seen that, during an ambient mode exposure, the light intensity, represented by dashed line 10, remains constant. At time zero the exposure control apparatus begins measuring scene light. After a lead time, represented by C, the shutter opens to begin the actual exposure. The shutter profile is represented by solid line 12. At a time T the exposure control apparatus generates the exposure termination signal, and after a lag time designated C the shutter actually closes to terminate the exposure. The total amount of light seen by the exposure control apparatus prior to the actual exposure is represented by the area labelled "W" under the illumination curve 10 and is equal to the constant C times the light intensity at time zero, $I(O)$. The amount of light seen by the film after the generation of the exposure termination signal, represented by the area labelled Y, is equal to C times the light intensity at time T, $I(T)$. Since the illumination is constant during an ambient mode exposure, the light intensity at time zero will be equal to the light intensity at time T and therefore the terms $C\,I(O)$ and $C\,I(T)$, in equation 2, will be equal and cancel each other. The remaining term in equation 2, the integral of $I(t)$ from zero to T, represented by the areas labelled W and X in FIG. 1, will predict a proper exposure, since the value of the integral will be identical to the integral $I(t)$ from zero plus C to T plus C, represented by the areas labelled X and Y in FIG. 1.

In the flash mode of exposure, as depicted in FIG. 2, the value of the term $C\,I(O)$ in equation 2 approaches zero since there is very little illumination during the lead time from time O to time O+C. The remaining non-zero terms in equation 2 results in an approximation of correct exposure when the equation is solved for T. The integral of $I(t)$ from O to T will account for the exposure represented by the area labelled X in FIG. 2, and the term $C\,I(T)$ will account for an additional desired exposure, occurring during the shutter lag, that is represented by the area labelled Y in FIG. 2. It will be noted that the area labelled Y is a rectangle having a width C and a height $I(T)$. The remaining area, labelled Z, represents a residual exposure error that has not been accounted for by the exposure control system.

At very close flash distances, the residual exposure error will be relatively large and will be in the direction of an overexposure since it is an exposure of the film that was not anticipated by the exposure control apparatus. As the distance between the camera and subject is increased, the residual error, i.e., the size of the area labelled Z, will decrease until a point is reached where the residual error is zero. This condition is obtained when the time T occurs slightly before the peak of the flash envelope. From this point, as subject distances become even greater, the residual error will be in the direction of an underexposure, the magnitude of which will increase, reach a maximum, and then decrease, approaching zero as the distance limits of flash photography are approached. This effect is graphically shown in FIG. 2, where the curve labelled $I(t')$ represents light level versus time when a more distant scene is illuminated by flash light. The shutter is signalled to close at T' and the residual exposure error is an underexposure represented by the area labelled Z'. The curve labelled $I(t'')$ represents the light intensity from a scene that approaches the distance limit for flash photography. The shutter is signalled to close at time T" and the residual exposure error is a relatively small underexposure represented by the area labelled Z".

Refer now to FIG. 3, where light intensity versus time is shown for an exposure in the fill-flash mode. The flash envelope $I(t)$ is superimposed on an ambient illumination level $I(O)$. When equation 2 is examined with respect to FIG. 3, it can be seen that the equation yields an approximate exposure that is as accurate as that given for the flash illumination mode as shown in FIG. 2. The term $CI(O)$ in equation 2 now represents the amount of exposure that is seen by the exposure control apparatus during the lead time C, but not seen by the film. This exposure is represented by the area under the illumination curve I(t) labelled W in FIG. 3. Since this exposure is also included in the integral of I(t) from zero to T, it is properly subtracted from the integral in equation 2. The exposure represented by the area labelled X is the remainder after subtracting the term CI(O) from the integral. As in the flash mode, the exposure received by the film, and which was anticipated by the exposure control apparatus, during the shutter lag period is approximated by the term CI(T) in equation 2 and is represented in FIG. 3 by the area labelled Y. Again, a residual exposure error represented by the area labelled Z is present.

Apparatus constituting the present invention resulted from a realization that exposure control could be improved, especially during close up flash photography, if the residual exposure error, represented by the areas labelled Z in FIGS. 2 and 3, is accounted for in the exposure control equation. One way of predicting the magnitude and direction, i.e., overexposure or underexposure, of this residual exposure error is to assume that the slope of the flash envelope remains substantially constant for a period of time equal to the lag time C, and, using this assumption, compute the area of a right triangle having a base C and a hypotenuse with a slope equal to the instantaneous value of the slope of the flash envelope I(t), i.e., the time rate of change in light intensity, at time T. The slope of the flash envelope is the first time derivative of the light intensity, dI(t)/dt, at t=T, defined hereinafter as dI(T)/dt. The area of a triangle having such a slope and a base C is represented by the expression $(C^2/2)dI(T)/dt$. When this rate dependent lag compensation term is included in equation 1, the exposure control equation becomes:

$$E = \int_O^T [I(t) + C\frac{dI(t)}{dt}] dt + \frac{C^2}{2} \frac{dI(T)}{dt} \quad (3)$$

A signal flow chart for an exposure control apparatus, according to the invention, that solves equation 3 for T, is shown in FIG. 4. As can be seen in FIG. 4, a photometer 40 receives scene light and produces in response thereto, a photosignal I(t) representing the light intensity. A differentiating circuit 42 responsive to the photosignal I(t) generates the time derivative of the photosignal, and a multiplier 44 multiplies the derivative by a constant C representing the lag time. The product (CdI(t)/dt) from the multiplier is added to the original photosignal I(t) by summing circuit 46. The signal representing the sum of the photosignal and the product of the derivative of the photosignal from summing circuit 46 is supplied to an integrating circuit 48 to produce a signal representing the time integral of the sum. The product of the derivative from multiplier 44 is further multiplied by a constant C/2 by a multiplier 50 to produce the rate dependent correction signal $(C^2/2)dI(t)/dt$. The product from multiplier 50 and the time integral from integrator 48 are summed by summing circuit 52 and the resulting sum is applied to the switching input of the trigger circuit 54. Trigger circuit 54 is supplied with a reference signal E representing the total exposure required and produces, at its output, an exposure termination signal T when the signal representing the corrected integrated photosignal equals the required total exposure E.

An exposure control circuit embodying the signal flow, according to the present invention, is shown schematically in FIG. 5. The circuit generally designated 80 is powered by a battery 82 that is connected across a power line 84 and a return line 86 in series with a main power switch 88. The main power switch 88 is adapted to be closed to activate the circuit prior to exposure control. The circuit 80 includes a photometer, generally designated 90, having a photodiode 92 connected across the inputs of an operational amplifier 94. A feedback resistor 96 is connected between an output 98 of operational amplifier 94 and the cathode of photodiode 92 so that a voltage $V_{(t)}$ is produced at the output 98 in proportion to the intensity of light impinging on photodiode 92. A series resistor 99 converts voltage $V_{(t)}$ to a proportional current $I_{(t)}$. A current expander 100 receives the current $I_{(t)}$ and mirrors it on output lines 102 and 104 as $I_{(t)}1$ and $I_{(t)}2$, respectively. Line 104 is connected to the input of a current amplifier 106 which multiplies the current $I_{(t)}2$ by a predetermined factor C, representing the lag time, and supplies the resulting product $CI_{(t)}2$ at its output 108. A current sensing resistor 110 is connected between lines 108 and return line 86 for sensing the current $CI_{(t)}2$ and thereby produces a voltage on line 108 proportional to the current. Line 108 is connected to one terminal of a capacitor 111. Changes in voltages on line 108, representing changes in photocurrent, are transmitted across capacitor 111, thereby providing a signal on the other terminal 112 of capacitor 111 that represents the time derivative of the photocurrent. This differentiated photocurrent is applied to a current expander 114 that mirrors the differentiated photocurrent on outputs 116 and 118 respectively. The current $CdI_{(t)}/dt$ on line 116 is supplied to a summing node 120, where it is summed with photoconductor $I_{(t)}1$ supplied by line 102. The differentiated photocurrent on line 118 is applied to a current amplifier 121 that multiplies the current by the predetermined constant C/2 and supplies the resulting current on an output 122. A current sensing resistor 124 is connected between lines 122 and return line 86 to sense the current and, thereby, produce a voltage on line 122 proportional to the current. The voltage is supplied to the input of a buffer 126.

An integrating capacitor 128 is connected between lines 102 and an output 129 of buffer 126. A normally closed initializing switch 130 is connected between lines 102 and return line 86 and serves to short integrator capacitor 128 until switch 130 is opened to initiate exposure control. Line 102 is connected to the switching input 131 of a level sensitive switch, such as trigger circuit 132. A reference voltage divider 134 connected across feed line 84 and return line 86 generates a reference voltage at its tap 136 that represents the predetermined required total exposure E. Trigger circuit 132 includes an output 138 that is normally held at a low voltage. When the voltage at switching input 131 equals or exceeds the reference voltage E, trigger circuit 132 supplies a high voltage at its output 138. An electromechanical transducer, shown as a solenoid 140, is connected between feedline 84 and the output 138 of trigger circuit 132, so that the solenoid is energized when the output voltage of trigger circuit 132 is low and is de-energized when the output voltage is high.

A flash illumination device 142, shown as a flash lamp 144 connected in series with a flash ignition switch 146 is connected across the feed and return lines 84 and 86.

In summary, the exposure control circuit functions as follows: After the circuit is energized by closing switch 88, light impinging on photosensor 92 causes a photocurrent $I_{(t)}$ to be produced by a photometer 90. The current expander 100 supplies this photocurrent to a summing node 120 and a current amplifier 106. The current is amplified by a predetermined constant C representing the lag time and is differentiated to produce a correction signal. The correction signal is added to the photosignal at summing node 120 to thereby apply a correction that is proportional to the change in the photocurrent from the beginning to the end of the exposure control interval. The thus corrected photocurrent is applied to the integrating capacitor 128 for forming the time integral of the corrected photocurrent. Switch 130 is opened to initiate the integration and start the exposure timing. The product of the differentiated photocurrent and the constant C is also supplied to a current amplifier that further multiplies the product by C/2 to generate a rate dependent correction current. The rate dependent correction current is sensed by a resistor and applied to the integrating capacitor via buffer 126 to thereby provide a correction to the integrated photosignal that is proportional to the time rate of change of the photosignal.

The resulting signal is applied to the switching input of trigger circuit 132. As long as the corrected integrated photosignal is less than the predetermined value E, representing the required total exposure, the output of trigger circuit 132 remains low, and the solenoid 140, which may actuate a shutter latch, remains energized to keep a shutter (not shown) open. When the value of the corrected integrated photosignal reaches E, the output of trigger circuit 132 becomes high, representing the exposure termination signal, thereby de-energizing solenoid 140. Thus, an improved correction is provided according to the invention by providing a correction proportional to the time rate of change of the photosignal.

If the flash illumination apparatus 142 is a quenchable electronic flash, the signal from the trigger circuit 132 on line 138 will represent a flash quench signal and will be supplied to the electronic flash apparatus via line 150 (shown in phantom). For control of electronic flash quench, the constant C would represent the quench lag and would be correspondingly smaller since a typical flash quench lag time is much smaller than a typical shutter lag time. In the case of flash quench, if the exposure termination signal is used both for commanding the shutter to close and to quench the flash, the flash will quench prior to actual shutter closing. The exposure occurring during shutter lag, however, may be adequately compensated by the lead time.

Figure 6:
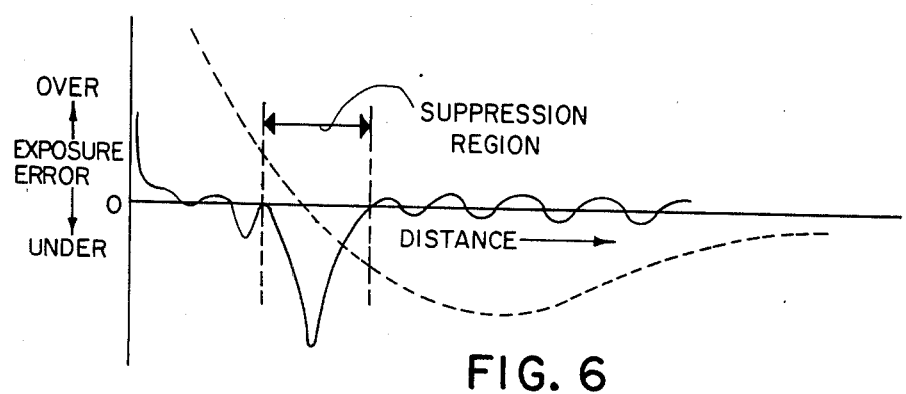
FIG. 6 is a graph showing the exposure error versus subject distance produced by an exposure control apparatus employing rate responsive light compensation according to the present invention, and the exposure error produced by prior art exposure control apparatus.

FIG. 6 compares the performance of an exposure control device incorporating rate dependent correction, according to the present invention, and the performance of the prior art devices by plotting exposure error versus distance for the respective devices. The solid line depicts the performance of an exposure control apparatus according to the present invention, and the dashed line represents the performance of the prior art devices. As can be seen from FIG. 6, the exposure error for an extremely close-up flash exposure has been significantly improved by the present invention. The underexposure error at intermediate distances is due to the fact that the time derivative of the function I(t) reverses polarity near the peak of the flash envelope. Since the peak is relatively narrow compared to the lag time, the predictor will overshoot the actual flash exposure, resulting in an underexposure. This effect may be minimized by suppressing the contribution of the term $(C^2/2)dI(t)/dt$ during the time when the flash peak is expected to occur, for example between 10 to 20 milliseconds after the start of major flash build-up. In FIG. 5 such a suppression circuit is shown schematically as a switch 154 that is adapted to be closed during the time that the peak of flash illumination is expected, to thereby suppress the effect of the rate dependent correction during this period.

The invention has been described with reference to a preferred embodiment, however it will be obvious to one of skill in the art that modifications can be made within the spirit and scope of the invention. For example, the exposure control circuit has been shown as an analog circuit; it will be obvious that an exposure equation containing a rate dependent correction term could be solved with a programmed digital computer circuit as well. Further, it will be noticed that the term $-CI(O)$ in equation 2 removes from the exposure control equation whatever contribution is made by the shutter lead time. Therefore, when the constant C represents a shutter lag time (as opposed to quench lag), such as is the case with chemical flash exposure, the built-in lead time may be eliminated from the exposure control system, in which case the exposure control equation would appear as follows:

$$E = \int_O^T I(t)\,dt + CI(T) + \frac{C^2}{2} \frac{dI(T)}{dt} \tag{4}$$

What is claimed is:

1. In an exposure control apparatus of the type including means for producing a light-dependent signal representing the intensity of light reflected from a scene, means for producing an integrated signal representing the time integral of said light-dependent signal, lag compensation means, coupled to said light-dependent signal producing means, for producing a first lag compensation signal proportional to the magnitude of scene light intensity at the time that an exposure termination signal is produced, means for adding said first lag compensation signal to said integrated signal to produce said exposure termination signal for adjusting an exposure interval to compensate for a time delay of said exposure control apparatus from the time at which said exposure termination signal is produced to the time at which actual termination of an exposure occurs, the improvement comprising:

means for producing a second lag compensation signal proportional to the instantaneous value of the time rate of change of said light-dependent signal at the time that said exposure termination signal is produced for further adjusting the exposure interval, whereby exposure error during extremely close-up flash operation is substantially reduced.

2. In an exposure control apparatus of the type characterized by the solution for T of the general exposure control equation of the form:

$$E = \int_O^T I(t)\,dt + CI(T)$$

where:
E is a predetermined constant representing a required total exposure,
I(t) is scene light intensity as a function of time, O is the time at which exposure control is commenced, T is the time required to achieve E, C is a predetermined constant representing a time delay of said exposure control apparatus between time T and actual termination of an exposure, and I(T) is the scene light intensity at time T, and wherein the term CI(T) serves to compensate for the time delay of said exposure control apparatus between the time T and the actual termination of an exposure, the improvement comprising:

means, responsive to the time rate of change of scene light intensity at time T, for providing additional compensation for said time delay of said exposure control apparatus such that said general exposure control equation is of the form:

$$E = \int_O^T I(t)\,dt + CI(T) + D\frac{dI(T)}{dt}$$

where:

D is a predetermined constant, and dI(T)/dt is the time rate of change of scene light intensity at time T whereby the term DdI(T)/dt serves to provide further compensation for said time delay so that the exposure error during extremely close-up flash illumination is substantially reduced.

3. Exposure control apparatus as claimed in claim 2, wherein D is substantially equal to $C^2/2$.

4. In an exposure control apparatus of the type having means for producing a light-dependent signal representing the intensity of light reflected from a scene, means for producing an integrated signal representing the time integral of said light-dependent signal, and means responsive to said integrated signal for producing an exposure termination signal to adjust an exposure time interval, the improvement comprising:

lag compensation means, coupled to said light-dependent signal producing means, including (1) first means for producing a first lag compensation signal which is functionally related to the time rate of change of said light-dependent signal at the time that said exposure termination signal is produced, and (2) second means for producing a second lag compensation signal which is functionally related to the magnitude of said light-dependent signal at the time that said exposure termination signal is produced; and means, coupled to said exposure termination signal producing means, said integrated signal producing means, and said lag compensation means, for adding (1) said first lag compensation signal, and (2) said second lag compensation signal to said integrated signal to produce said exposure termination signal for further adjusting the exposure time interval, whereby exposure error during extremely close-up flash operation is substantially reduced.

5. In an exposure control apparatus having means for producing a light-dependent signal representing the intensity of light reflected from a scene, and means responsive to said light-dependent signal for producing an exposure termination signal to adjust an exposure time interval, the improvement comprising:

(a) first lag compensation means, coupled to said light-dependent signal producing means, for producing a first lag compensation signal which is proportional to the magnitude of the time rate of change of said light-dependent signal at the time that said exposure termination signal is produced;

(b) second lag compensation means, coupled to said light-dependent signal producing means, for producing a second lag compensation signal proportional to the time rate of change of said light-dependent signal during said exposure time interval;

(c) means for summing said second lag compensation signal and said light-dependent signal;

(d) means for producing an integrated signal representing the time integral of the sum of said light-dependent signal and said second lag compensation signal; and (e) means, coupled to (1) said integrated signal producing means, (2) said first lag compensation means, and (3) said exposure termination signal producing means, for adding said first lag compensation signal to said integrated signal to produce said exposure termination signal when the sum of said integrated signal and said first lag compensation signal equals a predetermined level representing a desired exposure.

* * * * *